(12) United States Patent
Tang et al.

(10) Patent No.: US 12,000,626 B2
(45) Date of Patent: Jun. 4, 2024

(54) GEOTHERMAL DEVELOPMENT SYSTEM AND THE CONSTRUCTION METHOD THEREOF

(71) Applicants: MECHSOFT TECHNOLOGY (U.S.A.) CO., LLC, Kenmore, WA (US); DALIAN UNIVERSITY OF TECHNOLOGY, Liaoning (CN); DALIAN MECHSOFT CO., LTD, Liaoning (CN)

(72) Inventors: Chunan Tang, Liaoning (CN); Jian Zhao, Liaoning (CN); Juying Yang, Liaoning (CN); Tianhui Ma, Liaoning (CN); Sijing Wang, Liaoning (CN); Mu Tang, Liaoning (CN)

(73) Assignees: MECHSOFT TECHNOLOGY (U.S.A.) CO., LLC, Kenmore, WA (US); DALIAN UNIVERSITY OF TECHNOLOGY, Liaoning (CN); DALIAN MECHSOFT CO., LTD, Liaoning (CN)

( * ) Notice: Subject to any disclaimer, the term of this patent is extended or adjusted under 35 U.S.C. 154(b) by 925 days.

(21) Appl. No.: 17/040,897

(22) PCT Filed: Jan. 12, 2019

(86) PCT No.: PCT/CN2019/071502
§ 371 (c)(1),
(2) Date: Sep. 23, 2020

(87) PCT Pub. No.: WO2020/143066
PCT Pub. Date: Jul. 16, 2020

(65) Prior Publication Data
US 2021/0010718 A1    Jan. 14, 2021

(51) Int. Cl.
*F24T 10/30*    (2018.01)
*E21B 7/04*    (2006.01)
(Continued)

(52) U.S. Cl.
CPC .............. *F24T 10/30* (2018.05); *E21B 7/046* (2013.01); *F24T 10/15* (2018.05); *F24T 10/20* (2018.05); *Y02E 10/10* (2013.01)

(58) Field of Classification Search
CPC . F24T 10/30; F24T 10/15; F24T 10/20; F24T 2010/53; E21B 7/046; E21B 43/263; E21B 43/305; Y02E 10/10
See application file for complete search history.

(56) References Cited

FOREIGN PATENT DOCUMENTS

CN    106704123 A  *  5/2017
CN    106869864 A      6/2017
(Continued)

*Primary Examiner* — Ana M Vazquez
(74) *Attorney, Agent, or Firm* — MUNCY, GEISSLER, OLDS & LOWE, P.C.

(57) ABSTRACT

A geothermal development system includes a ground lifting system, a large-diameter shaft, an underground high temperature and high pressure heat transfer pool, a heat transfer diversion channel, a hot mine blasting fracture reservoir formed by an inlet blasting tunnel and a main tunnel, and a removable sealing device. The injection pipe and the collection pipe are set along the large diameter silo wall in the geothermal development system. The injection pipe is connected to the collection pipe through the heat transfer diversion channel in the dry hot rock. The circulation main roadway is arranged around the underground high temperature and high pressure heat transfer pool. Multiple blasting roadways are set along the main roadway level to form hot mine blasting fracture reservoir with loose blasting by caving method. A movable sealing device is arranged above the blasting layer of the large-diameter shaft.

8 Claims, 2 Drawing Sheets

(51) Int. Cl.
  *F24T 10/15* (2018.01)
  *F24T 10/20* (2018.01)

(56) References Cited

FOREIGN PATENT DOCUMENTS

| | | |
|---|---|---|
| CN | 206803542 U | 12/2017 |
| CN | 207230982 U | 4/2018 |
| WO | WO-2018206773 A1 | 11/2018 |

\* cited by examiner

GEOTHERMAL DEVELOPMENT SYSTEM AND THE CONSTRUCTION METHOD THEREOF

TECHNICAL FIELD

The present invention belongs to the technical field of geothermal development, in particular to a hot ore development system and the construction method thereof.

BACKGROUND

With the world energy supply and demand becoming increasingly tight, and the traditional energy is facing shortage and high carbon emissions, so the development and utilization of new energy has become a hot spot of research and development. Among them, the research and development of deep geothermal energy resources of 3000-10000 meters attracts more and more attention. However, due to the limitation of drilling technology, the utilization rate of geothermal resources is not high. Geothermal mainly comes from the radioactive decay inside the earth, and the heat source is sustainable at the scale of hundreds of millions of years. The deep geothermal development is the fundamental way to solve the future energy problems of mankind.

Using geothermal energy can solve the current environmental pollution and energy shortage problems. At present, geothermal energy is mined using Enhanced Geothermal storm System (EGS). Due to the use of drilling technology, small hole size and difficulty in hydraulic fracturing, that is, the temperature in the rock mass is sufficient, but the rock mass does not have enough permeability and fluid properties, resulting in insufficient heat energy to generate electricity. Enhanced Geothermal System (EGS) is to improve the permeability of rock mass by artificial, to increase output heat energy, and to improve the capacity. Compared with current energy sources, the development cost of this method is high and uneconomical. Besides, the permeability and fluid of rock mass will gradually decrease, and pipelines are easy to be blocked due to the influence of liquid impurities, so it has not been widely used.

Most of China's surface and shallow mineral resources have been discovered and utilized, and a large number of deep resources do not have the conditions for economic exploitation. Many mining companies are faced with the severe form of resource shortage, so how to get out of the current predicament and make it sustainable development has become the primary task of each mining industry.

SUMMARY

The purpose of the present invention is to solve the above problems and provide a geothermal development system based on deep shaft, which can not only solve the problems of resource shortage and bankruptcy faced by old mines, but also may make some deep resources that cannot meet the economic indicators of exploitation, which can be combined with deep geothermal development and have mining value.

Another purpose of the present invention is to provide a construction method of geothermal development system to avoid many shortcomings of existing mining methods, and at the same time, geothermal mining can be carried out by using existing mines or combining with deep mining, which can reduce engineering cost and reduce unnecessary redundant construction.

Technical solution of the invention A geothermal development system comprises a ground lifting system 1, a large-diameter vertical shaft 2, an underground high temperature and high pressure heat transfer pool 3, a heat transfer diversion channel 4, a water-rock geothermal reservoir 7 formed by an approach blasting roadway 5 and a main roadway 6. The hot ore development system is provided with an injection pipe 8 and a collection pipe 9 along the inner wall of a large-diameter vertical shaft 2. The injection pipe 8 is connected with the collection pipe 9 through the heat transfer diversion channel 4 in the borehole of the underground high temperature and high pressure heat transfer pool 3 in the dry hot rock. The main roadway 6 for circulation is arranged around the underground high temperature and high pressure heat transfer pool 3. Multi-layer of the main roadway 6 is arranged longitudinally along the large-diameter vertical shaft 2 and underground high temperature and the high pressure heat transfer pool 3 as required. The approach blasting roadways 5 are arranged horizontally in multiple drainage channels along the main roadway 6, and rock is loosened and blasted by caving method to form a hot mine blasting fracture reservoir 7. In addition, a movable sealing device 11 is arranged above the large-diameter vertical shaft 2 corresponding to the hot mine blasting fracture reservoir 7. Then, water is injected into the underground high temperature and high pressure heat transfer pool 3 to store water and form hydrothermal rock through the injection pipe 8, and the water injection function will not be recovered and closed. Using the U-tube principle, the cold water and the hydrothermal rock in the underground high temperature and high pressure heat transfer pool 3 are exchanged for heat by the injection pipe 8 and the collection pipe 9, realizing the double heat transfer. It not only obtains the heat in the dry hot rock, but also absorbs the heat of water heat exchange, forming a closed heat exchange system. Necessary personnel, equipment and mine resources are transported by the ground lifting system. The injection pipe 8 and the collecting pipe 9 are connected to power generation working platform installed on surface power generation system to form a closed cycle.

The section of the heat transfer diversion channel 4 is arranged into a circular pipe or roadway. The multi-layer is arranged in a spiral shape, which is arranged into multiple layers according to the site situation or actual requirements. The movable seal device 11 achieves the seal of the large-diameter vertical shaft 2.

The inlet pipe is separately arranged or controlled by a valve and combined with the injection pipe 8 into one pipe.

The diameter of the large-diameter vertical shaft 2 shall be large enough for the injection pipe 8 and the collection pipe 9 to be installed in the inner wall of the large-diameter vertical shaft 2 according to the on-site requirements.

The heat transfer diversion channel 4 is made of materials with good corrosion resistance and thermal conductivity. The injection pipe 8 and the collection pipe 9 are made of materials resistant to high temperature, high pressure and heat insulation.

The movable sealing device is arranged on the interior of a large-diameter vertical shaft 2. A support system 13 provided on the outer wall of the panel structure 12 of the movable sealing device is matched with fixed system 15 provided on the inner wall of the large-diameter vertical shaft 2 to realize adjustment slip and fixing of the panel structure. The movable sealing device is adjusted according to the hot mine blasting fracture reservoir 7 and is located above the hot mine blasting fracture reservoir 7. The movable sealing device mainly consists of the panel structure 12, the support system 13, a hydraulic device 14 and the peripheral fixed system 15. The panel structure 12 is the main structure, which has a certain thickness, and the internal arrangement of hydraulic devices. The support system 13 is arranged on the outer wall of the panel structure 12 and is matched with the fixed system 15 provided on the inner wall of the large-diameter vertical shaft 2, such as a buckle, etc. The hydraulic device 14 is positioned around the borehole of the panel structure 12 through the injection pipe 8 and the collection pipe 9 to hold the injection pipe 8 and the collection pipe 9 in place and is controlled by the mechanism. The peripheral fixed system 15 is supported on the inner wall of the large diameter vertical shaft 2, which is arranged in a continuous vertical way along the inner wall of the large-diameter vertical shaft 2 to fix the movable support system 13.

The movable sealing device 11 is arranged in two or more floors to prevent excessive loss at high temperature in the lower part of the shaft.

The panel structure 12 may be made of steel or concrete.

A construction method of geothermal development system comprises the following steps:

S1. construct a large-diameter vertical shaft 2 by means of shaft construction technology. After reaching the target layer, use the roadway construction technology to develop the underground high temperature and high pressure heat transfer pool 3 and the main roadway 6 laterally along the target layer. Multi-layer of the main roadway 6 is arranged longitudinally along large-diameter vertical shaft 2 as required.

S2. multi-row approach blasting roadway 5 is formed along the horizontal direction of the main roadway 6. In addition, blasting pipes 10 are arranged in advance in the approach blasting roadway 5. The orderly blasting of caving method is used to loosen the rock layer of hot ore and form the hot mine blasting fracture reservoir 7. Necessary personnel, equipment and mine resources are transported by the ground lifting system;

S3. a movable sealing device 11 shall be installed above the large-diameter vertical shaft 2 corresponding to the hot mine blasting fracture reservoir 7. The movable sealing device 11 is moved up and down along the large-diameter vertical shaft 2 to reduce heat loss according to the actual engineering requirements;

S4. lay an injection pipe 8 and a collection pipe 9 along the inner wall of a large-diameter vertical shaft 2 and extend it to an underground high temperature and high pressure heat transfer pool 3 to form a multi-layer spiral heat transfer diversion channel. Water is injected into the underground high temperature and high pressure heat transfer pool 3 by the injection pipe 8. After reaching a certain amount, water is closed to form hydrothermal rock. The injection pipe 8 and the collection pipe 9 exchange heat energy between cold water and the hydrothermal rock in the underground high temperature and high pressure heat transfer pool 3 to realize double heat transfer and form a closed cycle connected with the power generation working platform on the surface power generation system.

In Step S2, blasting is carried out in the approach blasting roadway 5. The loose subsidence area is formed by caving method, which is connected with the main roadway 6 and the underground high temperature and high pressure heat transfer pool 3 to form a penetrating area. When multi-layer of main roadway 6 is arranged, an approach blasting roadway 5 is arranged for each layer of main roadway 6.

In Step S3, the peripheral fixed system 15 is firstly set up during the construction of the large-diameter vertical shaft 2. The panel structure 12, the support system 13 and the hydraulic device 14 are assembled and integrated into the whole system in advance. Then, after the completion of construction of the large-diameter vertical shaft 2, the movable seal device 11 is placed in the large-diameter vertical shaft 2 and fixed in place in the peripheral fixation system 15 with the support system 13 on the inner wall of the large-diameter vertical shaft 2. Then the construction of the injection pipe 8 and the collection pipe 9 are carried out. Insert the injection pipe 8 and the collection pipe 9 through the removable seal 11 device and secure the injection pipe 8 and the collecting pipe 9 with a hydraulic device 14. Finally, according to the needs of the project, the movable sealing device 11 is moved up and down to select the appropriate position for fixed treatment;

In Step S4, underground high temperature and high pressure heat transfer pool 3 is not recycled after water is injected, forming hydrothermal rock, and heat transfer diversion channel 4 is used for heat exchange.

Beneficial Effects of the Present Invention 1) the construction of a new deep shaft or the continuous construction of a shaft on the original shaft of the mine are implemented in the hot ore development system provided by the invention. Carry out the horizontal roadway excavation after excavation to the target formation, so as to improve the liquid flow rate and the contact area between liquid and heat source. Conduct the rupture of hot dry rock to improve its permeability and fluid property through drilling, blasting and other measures. Or a heat conduction pipe is laid in the hot dry rock, and the liquid medium carrying heat energy is collected by the collection pipe, which is transported to the power generation platform through the wellbore for power generation.

2) Compared with traditional Enhanced Geothermal Systems (EGS) using two small hole and the medium of the liquid in the target hot dry rock transverse flow absorption of heat, the invention adopts a collection of large-diameter vertical shaft for geothermal energy. It can make medium of the liquid in the target hot dry rock longitudinal flow and transverse flow, and the extraction of geothermal energy method reduces the number of drilling platform and ground occupying space.

3) The traditional enhanced geothermal system (EGS) mainly relies on the method of hydraulic fracturing to increase the porosity and permeability of the target hot and dry rock, but it cannot guarantee the porosity and permeability of hot and dry rock, and pipelines are easy to be blocked during operation. The invention can effectively avoid the above shortcomings, and at the same time can give full play to the artificial measures to ensure the porosity and permeability of dry hot rock and increase the heat exchange area. At the same time, the thermal conduction pipe can be used to fully absorb the heat of dry hot rock and avoid the pipe clog.

4) The invention is conducive to the construction of deep mining heat system.

5) The invention does not use hydraulic fracturing technology, does not cause earthquakes, and does not have to worry about water pollution.

6) The invention can greatly increase the area of water and heat exchange and realize large-capacity geothermal development.

7) The invention makes use of the U-tube principle, and the upper and lower cold-water closed circulation scheme can minimize the system energy consumption, and at the same time completely avoid the corrosive pipeline or environmental pollution caused by harmful minerals in the deep.

8) The invention can be combined with deep mineral resources exploitation to achieve a win-win situation between mineral resources and geothermal resources utilization.

9) The movable sealing device has strong mobility and is easy to install. Besides, the structure of the shaft construction device is strong, which can well transfer the pressure around the shaft and effectively control the extrusion volume around the shaft to meet the design requirements.

10) The mobile construction operation of mobile devices can be recycled and placed as the mining depth of hot ore increases, which will reduce the waste of materials.

Where, 1 ground lifting system; 2 large-diameter vertical shaft; 3 underground high temperature and high pressure heat transfer pool; 4 heat transfer diversion channel; 5 approach blasting roadway; 6 main roadway; 7 water-rock geothermal blasting fissure reservoir; 8 injection pipe; 9 collection pipe; 10 blasting pipe; 11 movable sealing device; 12 panel structure; 13 support system; 14 hydraulic device; 15 peripheral fixed system; 16 lining; 17 surface power generation system.

DETAILED DESCRIPTION

The specific embodiments of the present invention will be further described below in conjunction with the drawings and technical solutions.

Example 1

Figure 1:
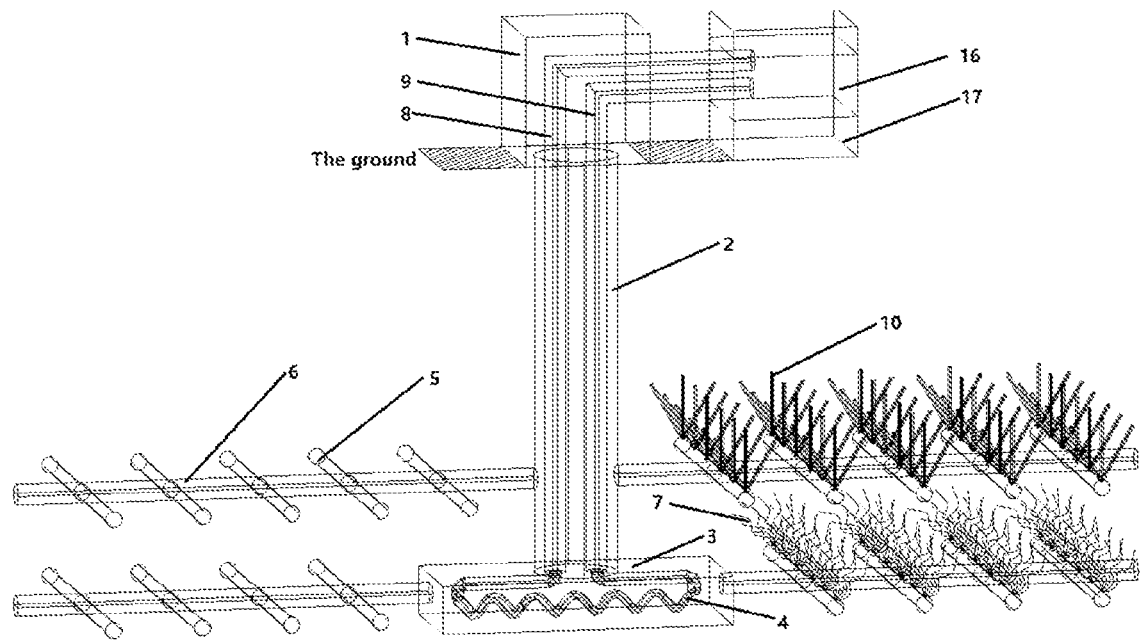
FIG. 1 is a structural diagram of the thermal ore development system in the invention.

A hot ore development system is provided in this embodiment as shown in FIG. 1, including a large-diameter vertical shaft 2. The diameter of large-diameter vertical shaft 2 is 3-10 m, and its vertical depth is 3000-10000 m, until the underground development forms the underground high temperature and high pressure heat transfer pool 3. The diameter of underground high temperature and high pressure heat transfer pool 3 is 30-50 m and the height is about 1 m, which is related to the number of layers set in heat exchanger diversion channel 4. Both the injection pipe 8 and the collection pipe 9 are arranged along the inner wall of the large-diameter vertical shaft 2, and the heat transfer diversion channel 4 is formed in the underground high temperature and high pressure heat transfer pool 3. The injection pipe 8 and the collection pipe 9 are made of materials resistant to high temperature, high pressure and heat insulation.

The injection pipe 8 is connected with the collection pipe 9 through the heat transfer diversion channel 4 in the underground high temperature and high pressure heat transfer pool 3. The diameter of heat transfer diversion channel 4 is 10-300 mm. The injection pipe 8 and the collection pipe 9 are connected to the power generation working platform 16 to form a closed cycle.

At the same time, the circulation main roadway 6 is arranged around the underground high temperature and high pressure heat transfer pool 3, and the multi-layer of main roadway 6 can be arranged longitudinally along the large-diameter vertical shaft according to the needs. Main roadway 6 has a diameter of 0.5 m and a length of 250 m. In addition, multiple of approach blasting roadway 5 was set along the level of main roadway 6. Approach blasting roadway 5 was used for orderly blasting to loosen the hot ore rock layer and formed water-rock geothermal blasting fissure reservoir 7 with main roadway 6. Transportation of necessary personnel, equipment and mine resources shall be carried out by ground lifting system 1.

The working process of the hot ore development system is as follows: the medium liquid, such as water, is injected from the power generation working platform 16 to the injection pipe 8. Under the action of pressure, the liquid reaches the injection port through the injection pipe 8, enters the target formation from the injection port, and enters the injection roadway. The liquid is filled up and injected into the tunnel. The liquid then passes through a hole in the hot dry rock under pressure. The liquid absorbs geothermal energy through a hole in the hot dry rock and reaches a collection tunnel or heat conducting pipe. The liquid fills the collection roadway, enters the collection pipe 9 through the collection port, and carries the liquid or vapor containing geothermal energy to the power generation working platform 16 for power generation. In this way, geothermal energy from the target formation is continuously brought to the surface for power generation.

Figure 2:
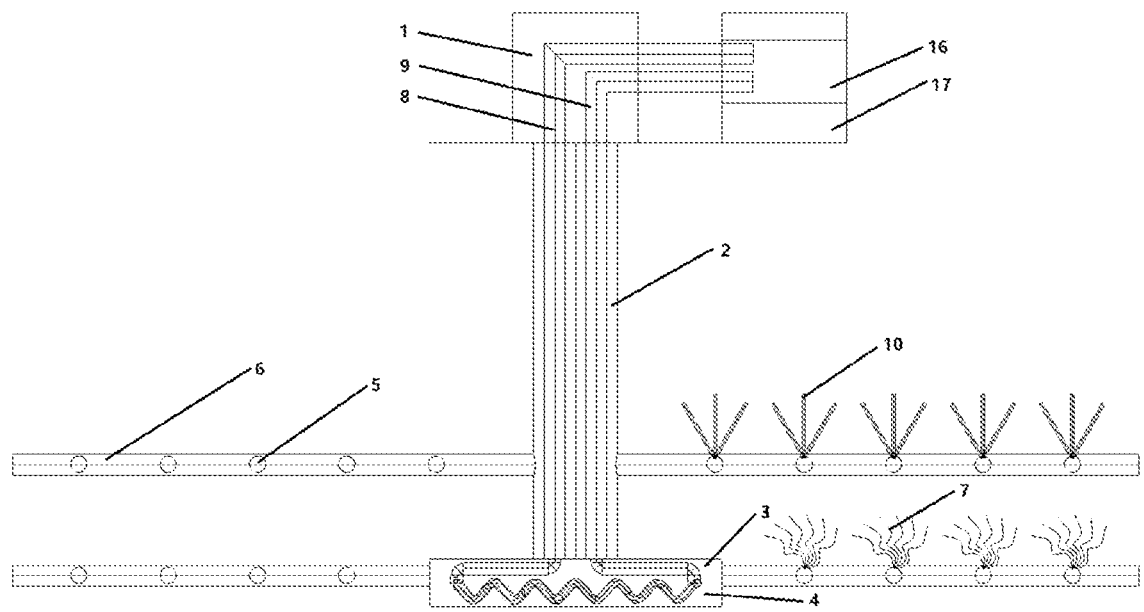
FIG. 2 is a schematic diagram of installation of the heat conduction tube in the invention.
Figure 3:
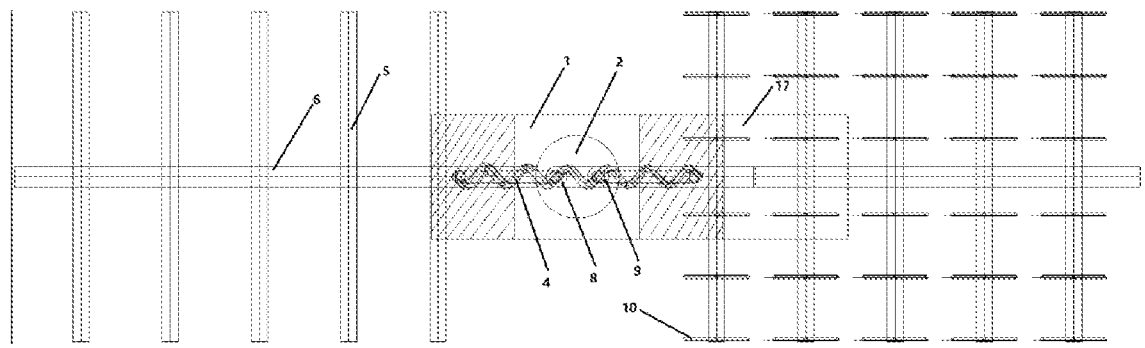
FIG. 3 is a overlooking structure diagram of the thermal ore development system in the invention.
Figure 4:
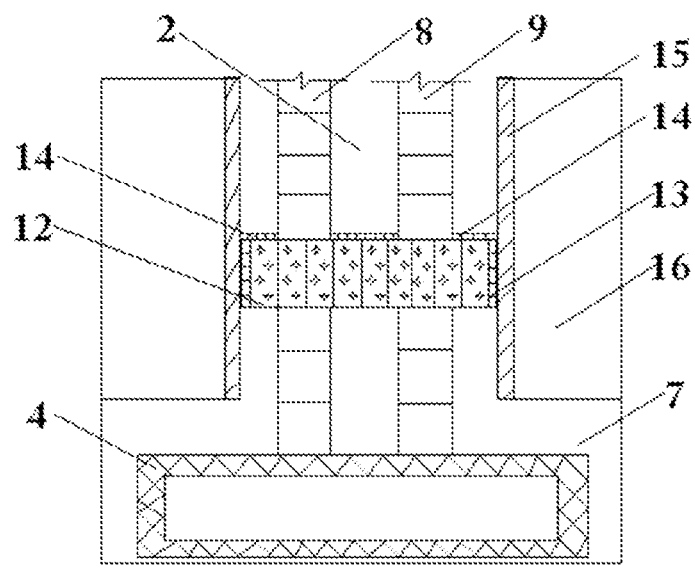
FIG. 4 is a structure diagram of the movable shaft sealing device in the invention.

To increase the liquid contact surface, the heat transfer diversion channel 4 is made of materials with high strength, corrosion resistance and good thermal conductivity. As shown in FIG. 2, multiple layers can be arranged in heat transfer diversion channel 4, and a movable sealing device 11 can be set above the water-rock geothermal blasting fissure reservoir 7. One end of heat transfer diversion channel 4 is connected with the injection pipe 8 and the other end is connected with the collection pipe 9. Thus, heat transfer diversion channel 4 can not only obtain the heat in the dry hot rock, but also absorb the heat exchange of water and heat, and bring the heat out through the liquid media in the collection pipe 9.

The present embodiment also provides a construction method for the geothermal development system, comprising the following steps:

S1. construct a large-diameter vertical shaft 2 by means of shaft construction technology. After reaching the target layer, use the roadway construction technology to develop the underground high-temperature and high-pressure heat transfer pool 3 and main roadway 6 laterally along the target layer. Multi-layer of the main roadway 6 is arranged longitudinally along large-diameter vertical shaft 2 as required.

S2. a multi-row of approach blasting roadway 5 is formed along the horizontal direction of the main roadway 6. In addition, blasting pipes 10 are arranged in advance in the approach blasting roadway 5. The orderly blasting of caving method is used to loosen the rock layer of hot ore and form the hot mine blasting fracture reservoir 7. Necessary personnel, equipment and mine resources are transported by the ground lifting system;

S3. a movable sealing device 11 shall be installed above the large-diameter vertical shaft 2 corresponding to the hot mine blasting fracture reservoir 7. The movable sealing device 11 is moved up and down along the large-diameter vertical shaft 2 to reduce heat loss according to the actual engineering requirements;

S4. lay an injection pipe 8 and a collection pipe 9 along the inner wall of a large-diameter vertical shaft 2 and extend it to an underground high temperature and high pressure heat transfer pool 3 to form a multi-layer spiral heat transfer diversion channel. Water is injected into the underground high temperature and high pressure heat transfer pool 3 by the injection pipe 8. After reaching a certain amount, water is closed to form hydrothermal rock. The injection pipe 8 and the collection pipe 9 exchange heat energy between cold water and the hydrothermal rock in the underground high-temperature and high-pressure heat transfer pool 3 to realize double heat transfer and form a closed cycle connected with the power generation working platform 16 on the surface power generation system.

In Step S2, in the approach blasting roadway 5, blasting is carried out. The loose subsidence area is formed by caving method, which is connected with the main roadway 6 and the underground high temperature and high pressure heat transfer pool 3 to form a penetrating area. When multi-layer of main roadway 6 is arranged, an approach blasting roadway 5 is arranged for each layer of main roadway 6.

In Step S3, the surrounding fixed system 15 is firstly set up during the construction of the large-diameter vertical shaft 2. The panel structure 12, the support system 13 and the hydraulic device 14 are assembled and integrated into the whole system in advance. Then, after the completion of construction of the large-diameter vertical shaft 2, the movable seal device 11 is placed in the large-diameter vertical shaft 2 and fixed in place in the peripheral fixation system 15 with the support system 13 on the inner wall of the large-diameter vertical shaft 2. Then the construction of the injection pipe 8 and the collection pipe 9 are carried out. Insert the injection pipe 8 and the collection pipe 9 through the removable seal 11 and secure the injection pipe 8 and the collection pipe 9 with a hydraulic device 14. Finally, according to the needs of the project, the movable sealing device 11 is moved up and down to select the appropriate position for fixed treatment;

In Step S4, the underground high temperature and high pressure heat transfer pool 3 is not recycled after water is injected, forming hydrothermal rock, and heat transfer diversion channel 4 is used for heat exchange.

Arrange injection pipe 8 and collection pipe 9, connect the ground and target layer, and form a complete loop in the geothermal development system and its construction method in this embodiment, by utilizing the large-diameter vertical shaft 2 and roadway formed by mine excavation technology and its advantages of large underground space and wide liquid contact surface. Combined with the technology of drilling and blasting rock breaking, the target layer is fractured. Finally, the liquid media is made to obtain the heat of the dry hot rock through the heat transfer diversion channel 4 to the heat exchange pool filled with water, and then the liquid or steam containing geothermal energy is carried to the ground for generating electricity through the collection pipe 9.

Example 2

A hot ore development system is provided in this embodiment as shown in FIG. 2, including a large-diameter vertical shaft 2. The diameter of large-diameter vertical shaft 2 is 3-10 m, and its vertical depth is 3000-10000 m, until the underground development forms the underground high temperature and high pressure heat transfer pool 3. The diameter of the underground high temperature and high pressure heat transfer pool 3 is 30-50 m and the height is about 1 m, which is related to the number of layers set in heat exchanger diversion channel 4. Both the injection pipe 8 and the collection pipe 9 are arranged along the inner wall of the large-diameter vertical shaft 2, and the heat transfer diversion channel 4 is formed in the underground high temperature and high pressure heat transfer pool 3. The injection pipe 8 and the collection pipe 9 are made of materials resistant to high temperature, high pressure and heat insulation.

Boreholes are set in the dry hot rocks, and underground high temperature and high pressure heat transfer pool 3 is paved with heat transfer channel 4, which is made of materials with high strength, corrosion resistance and good thermal conductivity. As shown in FIG. 2, a number of heat transfer channel 4 is arranged in an annular way in the middle of the dry hot rock. Multiple layers can be arranged for the heat conduction pipe, and a movable sealing device 11 is set above the blasting layer. One end of heat transfer diversion channel 4 is connected with injection pipe 8, and the other end is connected with the collection pipe 9. Both injection pipe 8 and collection pipe 9 are connected with the power generation working platform 16, thus forming a closed cycle. The ground lifting system 1 shall carry out necessary transportation of personnel, equipment and mine resources, so that the heat conduction tube can fully absorb the heat from the dry hot rock, and carry the heat energy to the power generation working platform 16 through collecting the liquid media in the collection pipe 9.

The geothermal development system works by injecting a medium liquid, such as water, from the power generation platform into the injection pipeline. The liquid reaches the heat conducting pipe through the injection pipe under pressure. The liquid still absorbs geothermal energy under the action of pressure through the heat conduction pipe in the dry hot rock and the water in the underground high temperature and high pressure heat transfer pool, and reaches the collection pipe, through which the liquid or steam carrying geothermal energy is transported to the power generation platform on the ground to generate electricity. In this way, the ground heat of the destination layer is constantly brought to the ground for electricity generation.

Ordinary technicians in the field will be aware that the embodiments described here are intended to help readers understand the principles of the invention and the scope of protection of the invention is not limited to such special statements and embodiments. According to these technical inspirations disclosed by the invention, ordinary technicians in this field may make various other specific deformation and combinations which are not divorced from the essence of the invention, and such deformation and combinations are still within the scope of protection of the invention.

The invention claimed is:

1. A geothermal development system, wherein comprising a ground lifting system, where a large-diameter vertical shaft, an underground high temperature and high pressure heat transfer pool, a heat transfer diversion channel, a hot mine blasting fracture reservoir formed by an approach blasting roadway and a main roadway; the geothermal development system is provided with an injection pipe and a collection pipe along an inner wall of a large-diameter vertical shaft; the injection pipe is connected with the collection pipe through the heat transfer diversion channel in a borehole of the underground high temperature and high pressure heat transfer pool in a dry hot rock; the main roadway for circulation is arranged around the underground high temperature and high pressure heat transfer pool; the main roadway is arranged longitudinally along the large-diameter vertical shaft and the underground high temperature and high pressure heat transfer pool; the approach blasting roadway is arranged horizontally in multiple drainage channels along the main roadway, and rock is loosened and blasted by caving method to form a hot mine blasting fracture reservoir; a movable sealing device is arranged above the large-diameter vertical shaft corresponding to the hot mine blasting fracture reservoir; then, water is injected into the underground high temperature and high pressure heat transfer pool to store water and form hydrothermal rock through the injection pipe, and a water injection function will not be recovered and closed; using a U-tube principle, cold water and the hydrothermal rock in the underground high temperature and high pressure heat transfer pool are exchanged for heat by the injection pipe and the collection pipe, realizing a double heat transfer; the cold water not only obtains the heat in the dry hot rock, but also absorbs the heat of water heat exchange, forming a closed heat exchange system; personnel, equipment and mine resources are transported by the ground lifting system; the injection pipe and the collection pipe are connected to a power generation working platform installed on surface power generation system to form a closed cycle.

2. The geothermal development system according to claim 1, wherein a section of the heat transfer diversion channel is arranged into a circular pipe or roadway; the multi-layer is arranged in a spiral shape; the movable sealing device achieves the seal of the large-diameter vertical shaft.

3. The geothermal development system according to claim 1, wherein the diameter of the large-diameter vertical shaft is large enough for the injection pipe and the collection pipe to be installed in the inner wall of the large-diameter vertical shaft.

4. The geothermal development system according to claim 3, wherein the heat transfer diversion channel is made of materials with good corrosion resistance and thermal conductivity; the injection pipe and the collection pipe are made of materials resistant to high temperature, high pressure and heat insulation.

5. The geothermal development system according to claim 1, wherein the movable sealing device is arranged in two or more floors to prevent excessive loss at high temperature in a lower part of the shaft.

6. The geothermal development system according to claim 5, wherein the panel structure may is made of steel or concrete.

7. A construction method of geothermal development system, comprising the following steps:
S1. constructing a large-diameter vertical shaft by means of shaft construction technology; after reaching a target layer, using a roadway construction technology to develop an underground high temperature and high pressure heat transfer pool and a main roadway laterally along the target layer; multi-layer of the main roadway is arranged longitudinally along a large-diameter vertical shaft;
S2. a multi-row approach blasting roadway is formed along a horizontal direction of the main roadway; in addition, blasting pipes are arranged in advance in the multi-row approach blasting roadway; an orderly blasting of caving method is used to loosen a rock layer of hot ore and form a hot mine blasting fracture reservoir; personnel, equipment and mine resources are transported by the ground lifting system;
S3. a movable sealing device is installed above the large-diameter vertical shaft corresponding to the hot mine blasting fracture reservoir; the movable sealing device is moved up and down along the large-diameter vertical shaft to reduce heat loss;
S4. laying an injection pipe and a collection pipe along an inner wall of the large-diameter vertical shaft and extend the large-diameter vertical shaft to an underground high temperature and high pressure heat transfer pool to form a multi-layer spiral heat transfer diversion channel; water is injected into the underground high temperature and high pressure heat transfer pool by the injection pipe; after reaching a certain amount, water is closed to form hydrothermal rock; the injection pipe and the collection pipe exchange heat energy between cold water and the hydrothermal rock in the underground high temperature and high pressure heat transfer pool to realize double heat transfer and form a closed cycle connected with the power generation working platform on a surface power generation system.

8. The construction method according to claim 7, wherein,
in Step S2, blasting is carried out in the approach blasting roadway; a loose subsidence area is formed by caving method, which is connected with the main roadway and the underground high temperature and high pressure heat transfer pool to form a penetrating area; when the multi-layer of the main roadway is arranged, the multi-row approach blasting roadway is arranged for each layer of the main roadway;
in Step S3, a peripheral fixed system is firstly set up during a construction of the large-diameter vertical shaft; a panel structure, a support system and a hydraulic device are assembled and integrated into the whole system in advance; then, after the completion of construction of the large-diameter vertical shaft, the movable sealing device is placed in the large-diameter vertical shaft and fixed in place in the peripheral fixation system with the support system on the inner wall of the large-diameter vertical shaft; then a construction of the injection pipe and the collection pipe are carried out; inserting the injection pipe and the collecting pipe through the removable sealing device and securing the injection pipe and the collection pipe with a hydraulic device; finally, the movable sealing device is moved up and down to select an appropriate position for fixed treatment;
in Step S4, the underground high temperature and high pressure heat transfer pool is not recycled after water is injected, forming hydrothermal rock, and the heat transfer diversion channel is used for heat exchange.

* * * * *